United States Patent [19]
Murai

[11] Patent Number: 5,400,495
[45] Date of Patent: Mar. 28, 1995

[54] METHOD FOR WELDING COILS ON AN ARMATURE FOR MINIATURE MOTORS

[75] Inventor: Kunitaka Murai, Matsudo, Japan

[73] Assignee: Mabuchi Motor Co., Ltd., Chiba, Japan

[21] Appl. No.: 166,739

[22] Filed: Dec. 13, 1993

Related U.S. Application Data

[63] Continuation of Ser. No. 797,218, Nov. 25, 1991, abandoned.

[30] Foreign Application Priority Data

Nov. 28, 1990 [JP] Japan .................................. 2-327598

[51] Int. Cl.6 .............................................. H02K 15/08
[52] U.S. Cl. ......................................... 29/597; 29/598; 310/234
[58] Field of Search ................... 29/597, 598; 310/234; 242/1.1 R, 7.05 A, 7.05 B, 7.05 C

[56] References Cited

U.S. PATENT DOCUMENTS 3,913,220  10/1975  Miller .................................. 29/597

FOREIGN PATENT DOCUMENTS 1045384  10/1966  United Kingdom .

*Primary Examiner*—Carl E. Hall
*Attorney, Agent, or Firm*—McGlew and Tuttle

[57] ABSTRACT

A method for winding coils on an armature for miniature motor which typically comprise an armature iron core of a multi-pole construction, having a plurality of coils wound thereon, a commutator disposed on an insulating cylinder fixedly fitted to a motor shaft, and ends of lead wires drawn from the coil connected to commutator tongues of the commutator, in which a plurality of coils are wound sequentially on the armature iron core, and the trailing end of the lead wire drawn from the lastly wound coil is connected to a predetermined commutator tongue after the lead wire is wound on the insulating cylinder at a predetermined angle in such a manner that the lead wire intersects and makes contact with all the lead wires lying between the already wound coils and the commutator tongues at least more than once.

7 Claims, 4 Drawing Sheets

METHOD FOR WELDING COILS ON AN ARMATURE FOR MINIATURE MOTORS

This is a file wrapper continuation of application Ser. No. 07/797,218, filed Nov. 25, 1991, now abandoned.

BACKGROUND OF THE INVENTION

This invention relates to a method for winding coils on an armature for miniature motors in which a plurality of coils are wound sequentially on an armature iron core, and all lead wires other than the lead wire drawn from the lastly wound coil are positively fastened to an insulating cylinder by winding the trailing end of the lead wire drawn from the lastly wound coil on the other wires.

DESCRIPTION OF THE PRIOR ART

FIG. 5 shows an example of a miniature motor having a commutator of a three-pole construction. In FIG. 5, an armature of a three-pole construction of the miniature/motor has such a construction that an armature iron core 2 having a plurality of armature poles 2-1, 2—2 and 2-3 (coils wound thereon are not shown) is fixedly fitted to a motor shaft 1. Commutator segments 4-1, 4-2 and 4-3 having commutator tongues 3-1, 3-2 and 3—3 are disposed on an insulating cylinder 5 fixedly fitted to the motor shaft 1.

FIG. 5 shows the armature iron core 2 before coils are wound on them and the commutator segments 4. FIG. 5 (A) is a front view thereof viewed from the direction of the motor shaft on the side of the commutator, and FIG. 5 (B) is a side view in the direction shown by arrow 5B—5B in FIG. 5 (A). In the figures, numerals 6A through 6C indicate slots existing among the armature poles 2-1, 2—2 and 2-3.

Coils are wound on the armature poles 2-1, 2—2 and 2-3, and the lead wires drawn from the coils are connected to predetermined commutator tongues 3-1, 3-2 and 3—3. Power is fed to the coils via the commutator segments 4-1, 4-2 and 4-3 and the commutator tongues 3-1, 3-2 and 3—3.

In the following, a conventional coil-winding method will be described, referring to FIGS. 6 through 8. FIGS. 6 through 8 are developments of coil windings of assistance in explaining the conventional coil-winding method. The armature of a miniature motor to which the conventional coil-winding method is applied comprises first through third armature poles 2-1 through 2-3 spaced equally at 120° intervals, and first and third commutator tongues 3-1 through 3—3 disposed in between the first through third armature poles 2-1 through 2-3.

FIG. 6 shows the most commonly used conventional coil-winding method. The lead wires drawn from the coils 7-1, 7-2 and 7-3 in this coil-winding method are extended in such a manner that they follow the shortest course to the commutator tongues 3-1, 3-2 and 3—3. That is, the coil winding starts with the second commutator tongue 3-2, that is, the leading end of the lead wire 1a is connected to the second commutator tongue 3-2, and then the lead wire 1a is extended in a predetermined direction (in the left direction in FIG. 6) and wound on the first armature pole 2-1 from above the slot 6B between the first armature pole 2-1 and the second armature pole 2—2 to form the first coil 7-1. Then, the trailing end of the lead wire 1b drawn from the first coil 7-1 is connected to the third commutator tongue 3—3. Although only one turn of the first coil 7-1 is shown in FIG. 6 for clarity's sake, the first coil 7-1 has a predetermined number of turns. This holds true for the second and third coils 7-2 and 7-3, which will be described later.

Next, the lead wire 1b drawn from the first coil 7-1 after being connected to the third commutator tongue 3—3 is extended in the same direction, without being cut, and wound to form the second coil 7-2, as in the case of the first coil 7-1. Similarly, the third coil 7-3 is formed, and the trailing end of the lead wire 3b drawn from the third coil 7-3 is connected to the second commutator tongue 3-2.

FIG. 7 shows another conventional coil-winding method that is essentially the same as the method shown in FIG. 6 described above, except that, as shown in the figure, the lead wires 1a through 3a drawn from the coils 7-1 through 7-3 are extended longer (120 degrees longer in terms of angle) than the example shown in FIG. 6.

Consequently, the lead wires 1a through 3a are partially brought into contact with the outer circumferential surface of the insulating cylinder 5 over an angular distance of 120°.

FIG. 8 shows still another conventional coil-winding method that is essentially the same as the conventional method shown in FIG. 7 described above, except that, as shown in the figure, the lead wires 1a through 3a, and 1b through 3b drawn from the coils 7-1 through 7-3 are extended longer by an angular distance of 120° than the conventional method shown in FIG. 6.

Consequently, the lead wires 1a through 3a, and 1b through 3b are partially brought into contact with the outer circumferential surface of the insulating cylinder 5.

In the conventional method shown in FIG. 6, since all the lead wires (1a through 3a, and 1b through 3b) drawn from the coils 7-1, 7-2 and 7-3 are extended in such a manner that they take the shortest course to the commutator tongues 3-1, 3-2 and 3—3, all the lead wires are suspended across the coils 7-1, 7-2 and 7-3 and the commutator tongues 3-1, 3-2 and 3—3.

Consequently, the conventional method shown in FIG. 6 involves unwanted problems, such as loosening and breakage, due to the adverse effects of motor revolution for long hours, vibration and shock.

In the conventional methods shown in FIGS. 7 and 8, too, the lead wires partially make contact with the insulating cylinder 5. As a result, similar unwanted problems to the above-mentioned method shown in FIG. 6 are encountered.

To overcome the aforementioned unwanted problems, such as loosening and breakage, the lead wires are often bonded to the insulating cylinder 5 using adhesive, etc. This results in increased manufacturing cost due to the increased manhours required for manufacturing armatures and increased material cost.

SUMMARY OF THE INVENTION

This invention is intended to overcome the aforementioned problems. To achieve this, this invention discloses a method for winding coils on an armature for miniature motors which typically comprise an armature iron core of a multi-pole construction on which a plurality of coils are wound, a commutator disposed on an insulating cylinder fixedly fitted to a motor shaft, and lead wires of the coils connected to commutator tongues, characterized in that a plurality of coils are wound on the armature iron core, the lead wire drawn from the lastly wound coil is wound on the insulating cylinder in such a manner as to intersect and make contact with all the other lead wires lying between the already wound coils and the commutator tongues at least more than once, with the trailing end thereof being connected to a predetermined commutator tongue.

These and other objects of this invention will become apparent from the following description taken in conjunction with FIGS. 1 through 4.

DETAILED DESCRIPTION OF THE EMBODIMENTS

Figure 1:
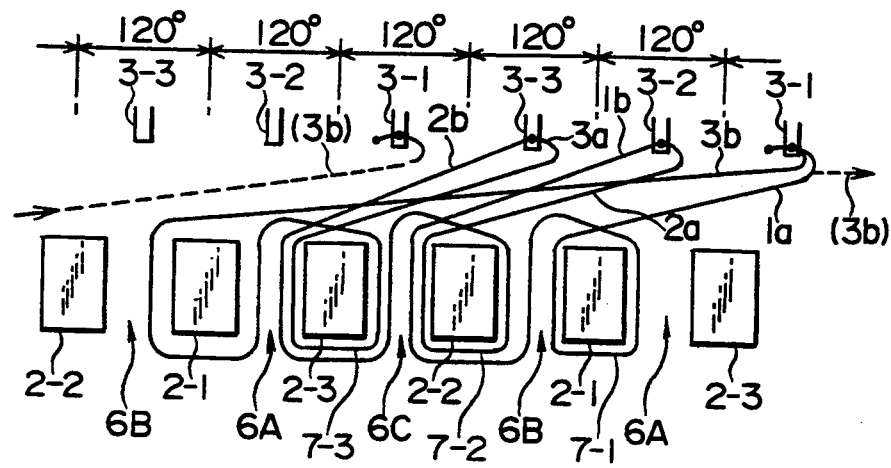
FIG. 1 is a development of coil windings of assistance in explaining a method for winding coils on an armature for miniature motors according to this invention.

FIGS. 1 through 4 are developments of coil windings of assistance in explaining a method for winding coil windings on an armature embodying this invention. Numerals in the figures correspond with those used in FIGS. 5 through 8.

The coil-winding process in the embodiment shown in FIG. 1 will be described sequentially.

1. First coil-winding process

The leading end of the lead wire 1a drawn from the first coil 7-1 is, after being connected to the first commutator tongue 3-1, extended by approximately 240° along the outer circumferential surface of the insulating cylinder 5 (shown in FIG. 5) in the same direction as the winding direction of the first coil 7-1 (the left direction, in the figure. Hereinafter referred to as the planned direction), inserted from above into the slot 6B between the first armature pole 2-1 and the second armature pole 2—2, then inserted into the slot 6A and returned to the slot 6B. As a result, the first coil 7-1 is formed on the first armature pole 2-1. The trailing end of the lead wire 1b drawn from the first coil 7-1 is passed through the lower part of the second armature pole 2—2 and the slot 6C, extended by approximately 240° in the direction opposite to the aforementioned planned direction (hereinafter referred to as the counter planned direction), and connected to the second commutator tongue 3-2. Although only one turn of the first coil 7-1 is shown in FIG. 1. The first coil 7-1 has a predetermined number of turns. The same holds true with the second and third coils 7-2 and 7-3.

2. Second coil-winding process

The trailing end of the lead wire 1b of the first coil 7-1 connected to the second commutator tongue 3-2 is, without being cut, extended by approximately 240° along the outer circumferential surface of the insulating cylinder 5 in the planned direction, inserted into the slot 6C, passed through the slot 6B, and returned to the slot 6C. As a result, the second coil 7-2 is formed on the second armature pole 2—2. The trailing end of the lead wire 2b drawn from the second coil 7-2 is, after passed through the lower part of the third armature pole 2-3 and the slot 6A, extended by approximately 240° in the counter planned direction, and connected to the third commutator tongue 3—3.

3. Third coil-winding process

The trailing end of the lead wire 2b of the second coil 7-2 connected to the third commutator tongue 3—3 is, without being cut, extended by approximately 240° along the outer circumferential surface of the insulating cylinder 5 in the planned direction, inserted into the slot 6A, passed through the slot 6C, and returned to the slot 6A. As a result, the third coil 7-3 is formed on the third armature pole 2-3. The trailing end of the lead wire 3b of the third coil 7-3 is, after passed through the slot 6A, the lower part of the first armature pole 2-1 and the slot 6B, extended along the outer circumferential surface of the insulating cylinder 5 by approximately 600° in the counter planned direction (as shown by solid lines in the figure), and connected to the first commutator tongue 3-1. The trailing end of the lead wire 3b of the third coil 7-3 may be extended by 360° (that is, one turn), without being connected to the first commutator tongue 3-1, and connected to the first commutator tongue 3-1. The lead wire 3b may be ex tended by 360° not only once but several times.

The embodiment shown in FIG. 1 is the method in which all the windings are wound on the armature by following the coil-winding processes 1 through 3 above. With this coil-winding method, all the other lead wires can be tightly fastened and positively secured to the insulating cylinder 5 by the lead wire of the final coil, that is, the lead wire 3b of the third coil 7-3.

Figure 2:
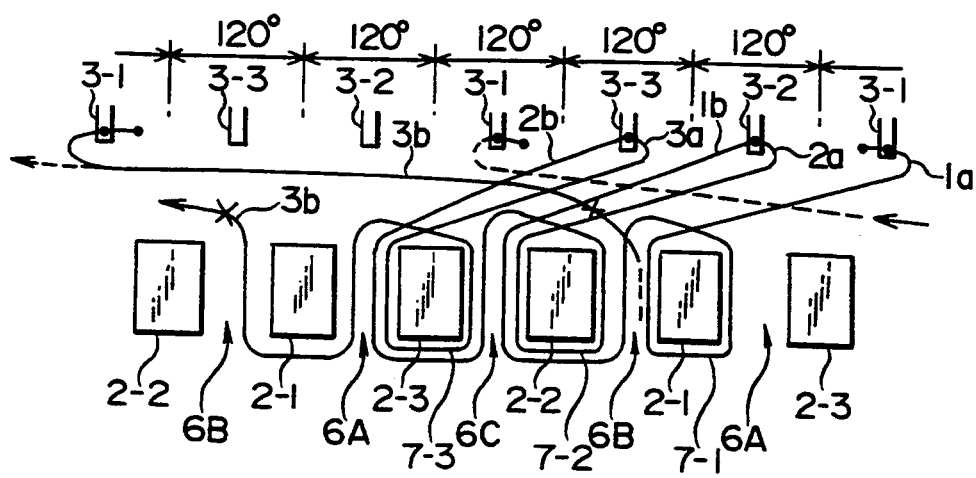
FIGS. 2, 3 and 4 are developments of coil windings of assistance in explaining other embodiments of this invention.
Figure 3:
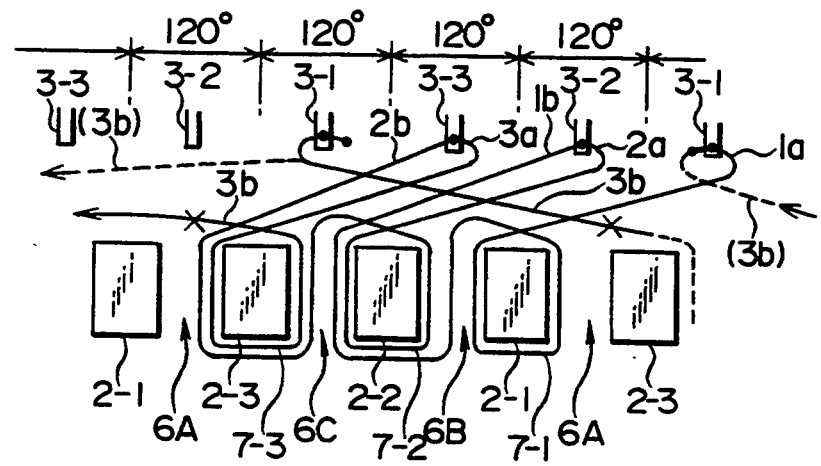
Figure 4:
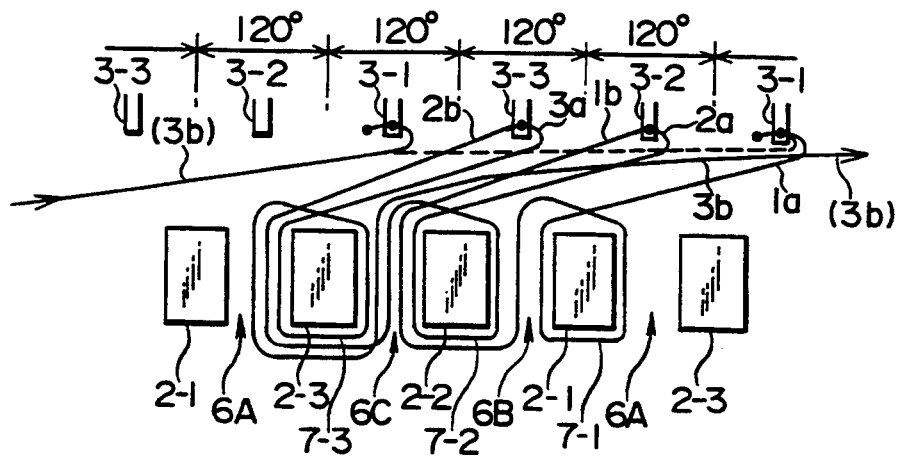
Figure 5A:
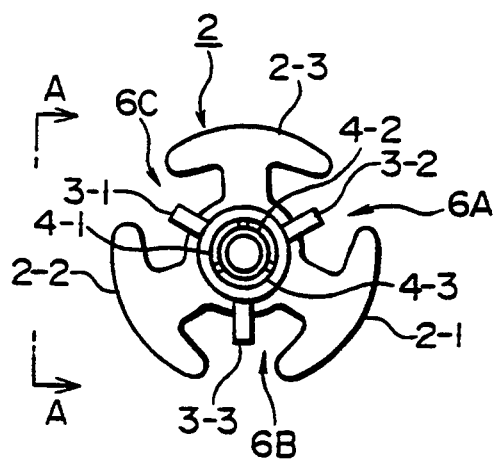
FIGS. 5A and FIG. 5B are top and side views, respectively, of prior art armature structure.
Figure 5B:
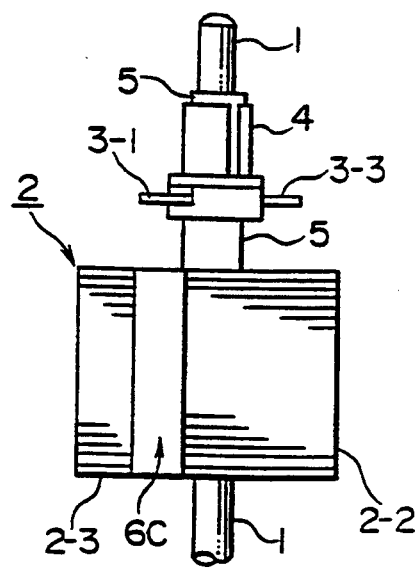
Figure 6:
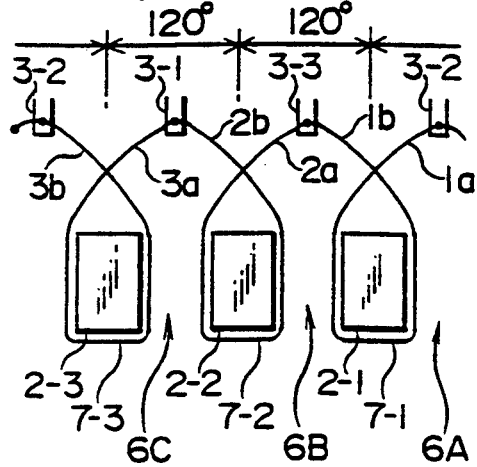
FIGS. 6, 7 and 8 show conventional coil winding methods.
Figure 7:
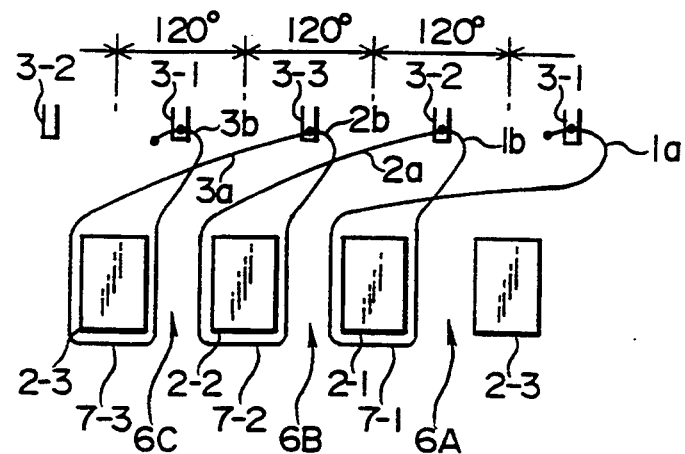
Figure 8:
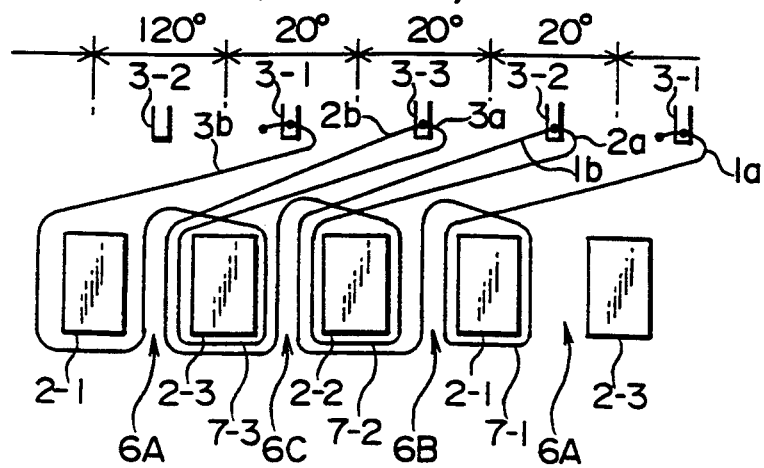

The embodiments shown in FIGS. 2, 3 and 4 are essentially the same as the embodiment shown in FIG. 1, except for the treatment method of the lead wire 3b of the third coil 7-3.

In the embodiment shown in FIG. 2, the trailing end of the lead wire 3b of the third coil 7-3 is passed through the slot 6A, the lower part of the first armature pole 2-1 and the slot 6B, extended by approximately 480° along the outer circumferential surface of the insulating cylinder 5 in the direction opposite to that in the embodiment shown in FIG. 1 (as shown by solid lines in the figure), and connectd to the first commutator tongue 3-1 (the mark X in FIG. 2 shows the same position on the lead wire 3b for convenience' sake). Or, the third lead wire 3b wound in the aforementioned manner is, without being connected to the first commutator tongue 3-1, extended further by 360° (as shown by dotted lines in the figure), and connected to the first commutator tongue 3-1. The lead wire 3b may be extended by 360° not only once but several times, as in the case of the embodiment shown in FIG. 1.

In the embodiment shown in FIG. 3, the trailing end of the lead wire 3b of the third coil 7-3 is wound on the third armature pole 2-3, extended by approximately 360° along the outer circumferential surface of the insulating cylinder 5 in the direction opposite to that in the embodiment shown in FIG. 1 (as shown by solid lines in the figure, without being passed through the slot 6A, and then connected to the first commutator tongue 3-1 (the mark X in FIG. 3 shows the same position on the lead wire 3b for convenience' sake). Or, the third lead wire 3b wound in the aforementioned manner is, without being connected to the first commutator tongue 3-1, extended by 360° (as shown by dotted lines in the figure), and then connected to the first commutator tongue 3-1. The lead wire 3b may be extended by 360° not only once but several times, as in the case of the embodiment shown in FIG. 1.

In the embodiment shown in FIG. 4, the trailing end of the lead wire 3b drawn from the third coil 7-3 is wound on the third armature pole 2-3, passed through the slot 6A, the lower part of the third armature pole 2-3 and the slot 6C, extended by approximately 720° in the same direction as that in the embodiment shown in FIG. 1, that is, in the planned direction (as shown by solid lines in the figure), and connected to the first commutator tongue 3-1. Or, the third lead wire 3b wound in the aforementioned manner is, without being connected to the first commutator tongue 3-1, extended by 360° (as shown by dotted liens in the figure), and connected to the first commutator tongue 3-1. The lead wire 3b may be extended by 360° not only once but several times, as in the case of the embodiment shown in FIG. 1.

In the embodiments shown in FIGS. 2 through 4, all the other lead wires are tightly fastened and positively secured to the insulating cylinder 5 by the lead wire drawn from the final coil, that is, the lead wire 3b of the third coil 7-3.

The method for winding coils on an armature for miniature motors according to this invention is not limited to an armature of a 3-pole construction in the aforementioned embodiments, but may be applied to armatures of the multi-pole constructions and armatures having lap-wound coils.

As described above, this invention, which makes it possible to improve the fastening state of lead wires between the commutator tongues and the coils, can achieve the following superior effects.

1. Lead wires are prevented from breakage due to motor revolution, vibration, impact, etc. since lead wires are free from loosening and lifting.

2. Coils are prevented from loosening, unwinding, lifting due to the loosening, lifting, etc. of lead wires since the lead wires are free from loosening, lifting, etc.

3. Miniature motors of high quality and high reliability can be provided because of the benefits 1 and 2 above.

4. Elimination of the need for adhesive and bonding processes for fixing lead wires helps reduce the time and labor required for manufacturing armatures, contributing to improved production efficiency and reduced cost.

What is claimed is:

1. A method for winding coils on an armature for miniature motors, the armature including an armature iron core of a multi pole construction having a plurality of coils wound thereon, a commutator disposed on an insulating cylinder fixedly fitted to a motor shaft, and lead wires of coils connected to commutator tongues of the commutator, the method comprising: winding a plurality of coils sequentially on the poles of said iron core, each coil having a lead wire extending from a respective pole of said iron core, to a respective commutator tongue wherein each said lead wire is wound about said insulating cylinder over a first angle, said angle corresponding to a first circumferential distance between the respective pole and the respective tongue, and is connected to said commutator tongue, and winding the lead wire drawn from a lastly wound coil about said insulating cylinder and over a second angle corresponding to a second circumferential distance, said second angle and said second circumferential distance both being greater than said first angle and said first circumferential distance, respectively and said lead wire passing over all previous lead wires to intersect and make contact with said all previous lead wires lying between previously wound coils and their respective commutator tongues, and subsequently connecting said lead wire to its respective commutator tongue.

2. A method of winding coils on an armature for miniature motors as set forth in claim 1 wherein said first angle is less than 360° and said second angle is more than 360°.

3. A method for winding coils on an armature for miniature motors as set forth in claim 2 wherein said lead wire drawn from said lastly wound coil is passed through a first slot, the lower part of a first armature pole, and a second slot, extended by approximately 600° along the outer circumferential surface of said insulating cylinder, and connected to a first commutator tongue.

4. A method for winding coils on a armature for miniature motors as set forth in claim 2 wherein said lead wire drawn from said lastly wound coil is passed through a first slot, the lower part of a first armature pole and a second slot, extended by approximately 480° along the outer circumferential surface of said insulating cylinder in a planned direction, and connected to a first commutator tongue.

5. A method for winding coils on an armature for miniature motors as set forth in claim 2 wherein said lead wire drawn from said lastly wound coil is, after being wound on a last of said poles of said iron core, extended by approximately 360° along the outer circumferential surface of said insulating cylinder above a first armature pole, instead of passing through a first slot, and connected to a first commutator tongue.

6. A method for winding coils on an armature for miniature motors as set forth in claim 2 wherein said lead wire drawn from said lastly wound coil is, after being wound on a last of said poles of said iron core, passed through a first slot, the lower part of a last armature pole, and a last slot, extended by approximately 720° along the outer circumferential surface of said insulating cylinder in the direction opposite to a planned direction, and connected to a first commutator tongue.

7. A method for winding coils on an armature for miniature motors as set forth in one of claim 3 or claim 4 or claim 5 or claim 6 wherein said lead wire drawn from said lastly wound coil and extended along the outer circumferential surface of said insulating cylinder to be connected to a first commutator tongue is further extended by at least 360° along the outer circumferential surface of said insulating cylinder.

* * * * *